United States Patent [19]

Miwa

[11] 3,922,340
[45] Nov. 25, 1975

[54] PHARMACEUTICAL COMPOSITIONS FOR TREATING LUNG DISEASES

[75] Inventor: Hideyuki Miwa, Kyoto, Japan

[73] Assignee: Otsuka Pharmaceutical Company Limited, Tokyo, Japan

[22] Filed: Dec. 3, 1973

[21] Appl. No.: 421,273

[30] Foreign Application Priority Data
Dec. 7, 1972   Japan.............................. 47-122839

[52] U.S. Cl. .................. 424/45; 424/311; 424/312; 424/319; 424/329
[51] Int. Cl.² .................. A61L 9/04; A61K 31/22; A61K 31/23; A61K 31/14
[58] Field of Search ............. 424/329, 45, 311, 312, 424/319

[56] References Cited
OTHER PUBLICATIONS
Hahn et al., Chem. Abst., Vol. 76, (1972), p. 10547s.

Yoshikawa et al., Chem. Abst., Vol. 76, (1972), p. 81008c.

*Primary Examiner*—Sam Rosen
*Attorney, Agent, or Firm*—Bierman & Bierman

[57] ABSTRACT

A method for treating a lung disease causing an abnormal decrease in blood oxygen level comprising administering at least one l-carnitine derivative having the formula

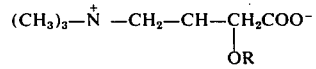

wherein R is hydrogen or a fatty acid residue having 4 to 24 carbon atoms.

2 Claims, No Drawings

PHARMACEUTICAL COMPOSITIONS FOR TREATING LUNG DISEASES

This invention relates to a pharmaceutical composition for treating lung diseases. More particularly, the invention pertains to a composition effective to treat atelectasis, pulmonary edema and like lung diseases which entail an abnormal decrease in the oxygen concentration in the blood and to a therapy for such diseases using the above composition.

The present composition comprises a pharmaceutically effective amount of at least one of l-carnitine derivatives and salts thereof with pharmaceutically acceptable acids, said l-carnitine derivatives having the formula of

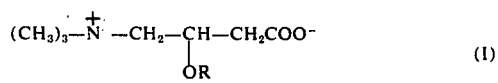

$$(CH_3)_3 - \overset{+}{N} - CH_2 - \underset{\underset{OR}{|}}{CH} - CH_2COO^- \tag{I}$$

wherein R is a hydrogen atom or a fatty acid residue having 4 to 24 carbon atoms.

According to the researches of the present inventors it has been found for the first time that the l-carnitine derivatives having the above formula (I) exhibit an excellent pharmaceutical effect on atelectasis, pulmonary edema and like lung diseases which cause an abnormal decrease in the oxygen concentration in the blood. Further l-carnitine derivatives are low in toxicity and therefore can be used safely.

The l-carnitine derivatives to be used in the invention are known in the art, but the pharmaceutical activities for the lung diseases have not been known yet. The l-carnitine derivatives to be used in the invention are represented by the structural formula (I) above and include l-carnitine per se and derivatives thereof in which the hydroxyl group of l-carnitine is esterified with a fatty acid having 4 to 24 carbon atoms, preferably with a saturated fatty acid having 6 to 20 carbon atoms. That is to say, the preferable l-carnitine derivatives are those having the formula (I) above in which R is an acyl radical of 6 to 20 carbon atoms. Examples of the l-carnitine derivatives are l-carnitine, l-butanoyl carnitine, l-hexanoyl carnitine, l-octanoyl carnitine, l-decanoyl carnitine, l-palmitoyl carnitine, l-arachidonoyl carnitine, and the like. Also employable are salts of these compounds with pharmaceutically acceptable acids, such as hydrochloric acid, phosphoric acid, maleic acid, fumaric acid, etc. Preferable are l-hexanoyl carnitine, l-octanoyl carnitine and l-palmitoyl carnitine and pharmaceutically acceptable acid addition salts thereof.

The following is the 50% lethal dose ($LD_{50}$) of the l-carnitine derivatives, which was determined by administrating each compound orally and intravenously to dd mice.

| l-Carnitine derivatives | Oral administration $LD_{50}$ (mg/kg) | Intravenous administration $LD_{50}$ (mg/kg) |
|---|---|---|
| l-Carnitine, l-butanoyl carnitine, l-hexanoyl carnitine and l-octanoyl carnitine | 8,000 – 10,000 | 1,600 – 1,800 |
| l-Decanoyl carnitine, l-palmitoyl carnitine and | 1,000 – 3,000 | 300 – 500 |

| l-Carnitine derivatives | Oral administration $LD_{50}$ (mg/kg) | Intravenous administration $LD_{50}$ (mg/kg) |
|---|---|---|
| l-arachidonoyl carnitine | | |

For therapeutic use, at least one of l-carnitine derivative of formula (I) and pharmaceutically acceptable acid addition salts thereof can be administered in the form of a pharmaceutical composition which may be appropriate to the desired mode of administration. The composition contains the compound in a pharmaceutically effective amount which is usually in the range of 1 to 10 weight percent, based on the weight of the composition. Particularly, the compounds of the invention are preferably inhaled for treatment in the form of aerosol composition. The aerosol composition comprises, for example, at least one of l-carnitine derivatives of formula (I) and pharmaceutically acceptable acid addition salts thereof, water, a lower alkanol and a propellant. The alkanol to be used is a pharmaceutically acceptable lower alkanol having 2 to 3 carbon atoms, such as ethanol and isopropanol. Examples of the propellant are nontoxic lower fluoro- and/or chloro- alkanes, such as dichlorodifluoromethane and dichlorotetrafluoroethane. The preferable concentration of each component in the aerosol composition is as follows:

| | Concentration | |
| Component | Favorable | Optimum |
|---|---|---|
| l-carnitine derivative or salt thereof | 1 – 10 wt.% | 3 – 7 wt.% |
| Water | 3 – 15 wt.% | 6 – 10 wt.% |
| Alkanol | 10 – 40 wt.% | 20 – 30 wt.% |
| Propellant | 50 – 80 wt.% | 60 – 70 wt.% |

The aerosol composition can be enclosed in a pressure-vessel of aerosol type in the conventional manner.

Further, the aqueous solution of the effective compounds of the invention can be applied to inhalation treatment by nebulization thereof. In this case, it is preferable to use the present compounds in the form of an acid addition salt, particularly hydrochloric acid salt. The concentration of the effective compound is preferably in the range of 1 to 10 weight percent.

The effective compound of the invention can be used for lung washing in the form of aqueous solution dissolved in water or in physiological sodium chloride solution. In this case the effective compound is preferably used in the form of acid addition salt, particularly hydrochloric acid salt and preferably dissolved in 0.9 weight percent physiological sodium chloride solution which is conventionally employed for lung washing. The concentration of the effective compound is preferably in the range of 1 to 10 weight percent.

Of these forms the inhalation composition of aerosol type is the most preferable, since it is convenient in administration and will ensure the most effective treatment.

The composition is administered at a dose of 5 to 20 mg, preferably 10 to 15 mg in terms of l-carnitine at one time and the daily dose can range from 10 to 600 mg.

For a better understanding of the invention examples are given below.

EXAMPLE 1

4 g of l-octanoyl carnitine hydrochloride was dissolved in 7 g of water and the solution was diluted with 27 g of ethanol. The resultant mixture was enclosed in combination with 62 g of dichlorodifluoromethane in a pressure-vessel to prepare an inhalation composition of aerosol type.

EXAMPLES 2 TO 7

Six kinds of inhalation compositions of aerosol type containing the components shown in Table 1 below were prepared in the same manner as in Example 1.

| Example No. | Effective compound Kind | Amount (g) | Water (g) | Ethanol (g) | Propellant Dichlorodifluoromethane (g) | Dichlorotetrafluoroethane (g) |
|---|---|---|---|---|---|---|
| 2 | l-octanoyl carnitine hydrochloride | 6 | 10 | 24 | 60 | 0 |
| 3 | l-octanoyl carnitine | 3 | 5 | 25 | 47 | 20 |
| 4 | l-palmitoyl carnitine hydrochloride | 4 | 6 | 25 | 65 | 0 |
| 5 | l-palmitoyl carnitine hydrochloride | 5 | 6 | 27 | 45 | 17 |
| 6 | l-palmitoyl carnitine hydrochloride | 3 | 5 | 25 | 67 | 0 |
| 7 | l-carnitine hydrochloride | 4 | 6 | 25 | 65 | 0 |

The effect of the present composition can be seen from the following clinical data obtained by using the compositions of Examples 1, 5 and 7.

CLINICAL DATA 1

A 3-month-old female patient with mitral insufficiency was operated for the replacement of mitral valve, Postoperatively, the oxygen concentration in the blood (hereinafter referred to as "$PaO_2$") was 70 mm Hg, and oxygen tent was provided for the patient. When the concentration value lowered to 40 mm Hg 3 days after operation, the patient was given the composition in aerosol form prepared in Example 1. Inhalation of the composition caused marked coughing, but $PaO_2$ increased to 70 mm Hg in 1 hour. The composition was administered at a dose of 10 mg in terms of l-carnitine every hour three times. On the 4th day and thereafter, the composition was given by inhalation three times, every morning and evening, at a dose of 10 mg in terms of l-carnitine every time. In the evening of 6th day, the oxygen tent was removed.

CLINICAL DATA 2

A 21-year-old female patient with fallot's tetrad was operated. Due to postoperative reduction in $PaO_2$, the patient was given pure oxygen, which was found ineffective to elevate $PaO_2$. The next day following the operation, the composition of Example 5 was administered by inhalation at a dose of 10 mg in terms of l-carnitine every hour three times. In 3 hours, $PaO_2$ rose to 90 mm Hg. After continual administration of the composition for 3 days, the supply of oxygen was discontinued.

CLINICAL DATA 3

An atrial septal defect and mitral and tricuspid ruptures were closed. Immediately after regaining consciousness from anaesthesia with hypothermia, the patient had $PaO_2$ of about 40 mm Hg, and $PaO_2$ remained at the low level in spite of inhalation of pure oxygen, while $CO_2$ concentration in the blood ($PaCO_2$) was as low as 25 mm Hg, hence slight acidosis.

One hour after recovery from anaesthesia and thereafter, the composition of Example 7 was given to the patient every hour at a dose of 10 mg/hr, calculated as l-carnitine to elevate $PaO_2$. Consequently, $PaO_2$ rose to 50 mm Hg in 1 hour, to 60 mm Hg in 3 hours and to 70 mm Hg in 4 hours. The patient recovered from acidosis with the increase in $PaO_2$. The administration of drug was terminated with the fourth dosage, and the patient was given an oxygen tent, whereby $PaO_2$ was thereafter maintained at an almost constant value of 70 mm Hg.

We claim:

1. A method for treating a lung disease causing an abnormal decrease in the oxygen concentration in the blood which comprises administering an effective amount of at least one compound taken from the class consisting of l-carnitine derivatives and salts thereof with pharmaceutically acceptable acids by inhalation to a patient, said l-carnitine derivative having the formula of

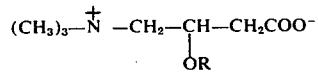

wherein R is a hydrogen atom or a fatty acid residue having 4 to 24 carbon atoms.

2. The method of claim 1 in which said compound is in the form of an aerosol composition comprising 1 to 10 weight percent of said compound, 3 to 25 weight percent of water, 10 to 40 weight percent of a pharmaceutically acceptable lower alkanol and 50 to 80 weight percent of a propellant.

* * * * *